(12) United States Patent
Zeng (10) Patent No.: US 10,050,667 B2
(45) Date of Patent: Aug. 14, 2018

(54) NETWORK CONNECTION DEVICE AND CABLE STATUS DETECTION METHOD

(71) Applicant: ALi Corporation, Hsinchu (TW)

(72) Inventor: Zhi-Ming Zeng, Shanghai (CN)

(73) Assignee: ALi Corporation, Hsinchu (TW)

( * ) Notice: Subject to any disclaimer, the term of this patent is extended or adjusted under 35 U.S.C. 154(b) by 50 days.

(21) Appl. No.: 15/288,762

(22) Filed: Oct. 7, 2016

(65) Prior Publication Data

US 2017/0201436 A1 Jul. 13, 2017

(30) Foreign Application Priority Data

Jan. 8, 2016 (CN) .......................... 2016 1 0013847

(51) Int. Cl.
 *H04B 3/46* (2015.01)
 *H04N 7/16* (2011.01)
 *H04N 21/61* (2011.01)

(52) U.S. Cl.
 CPC ............... *H04B 3/46* (2013.01); *H04N 7/163* (2013.01); *H04N 21/6118* (2013.01)

(58) Field of Classification Search
 CPC ..................................................... H04B 3/145
 See application file for complete search history.

(56) References Cited

U.S. PATENT DOCUMENTS 6,980,007 B1 * 12/2005 Lo .................. G01R 31/083
 324/533

\* cited by examiner

*Primary Examiner* — Chandrahas B Patel
(74) *Attorney, Agent, or Firm* — J.C. Patents (57) ABSTRACT

A network connection device and a cable status detection method are provided. The network connection device is configured to connect and detect a connection cable. The network connection device includes an interface module, a physical layer transmission circuit and a cable status detection module. The interface module connects the connection cable. The physical layer transmission circuit sends signals to the connection cable or receives signals from the connection cable through the interface module. The cable status detection module receives a notification notifying that the physical layer transmission circuit is in a disable state, and detects the status of the connection cable and generates a detection result when the physical layer transmission circuit is in the disable state. In this way, the network connection device may transmit data signals though the connected connection cable and detect the status of the connection cable.

23 Claims, 6 Drawing Sheets

NETWORK CONNECTION DEVICE AND CABLE STATUS DETECTION METHOD

CROSS-REFERENCE TO RELATED APPLICATION

This application claims the priority benefit of China application serial no. 201610013847.2, filed on Jan. 8, 2016. The entirety of the above-mentioned patent application is hereby incorporated by reference herein and made a part of this specification.

BACKGROUND OF THE INVENTION

Field of the Invention

The invention relates to a physical connection interface device, and particularly relates to a network connection device and a cable status detection method.

Description of Related Art

Computer devices supporting a physical network connection are all configured with a physical connection interface device such as a network interface card (NIC), etc. The computer device can be connected to a physical connection cable such as a network cable, etc., though the physical connection interface device. If another end of the physical connection cable is connected to a network gateway device such as a modem or a router, etc., the computer device may send signals to a network or receive signals from the network through the physical connection cable. The quality of the physical connection cable may influence the quality of the signals transmitted on the physical connection cable.

Generally, the quality of the physical connection cable cannot be determined from the appearance thereof. Therefore, when the computer device has a poor signal transceiving ability on network signals, the user often cannot determine which step of the signal transmission process has a problem. If someone want to inspect the status of a certain physical connection cable, a professional inspection device is required to be used. Generally, the price of a professional inspection device used for detecting the status of the physical connection cable is expensive, and individual users will not be willing to buy one. Moreover, to take the physical connection cable to the product-selling store or related factory for inspection is not cost-effective.

SUMMARY OF THE INVENTION

The invention is directed to a network connection device and a cable status detection method, where a cable status detection module configured in the network connection device is used to detect a status of a connection cable, such that the network connection device has both of a signal transmission ability and a connection cable status detection ability.

An embodiment of the invention provides a network connection device. The network connection device includes an interface module, a physical layer transmission circuit and a cable status detection module. The interface module is configured to be connected to the connection cable. The physical layer transmission circuit is coupled to the interface module and is configured to send signals to the connection cable or receive signals from the connection cable through the interface module. The cable status detection module is coupled to the physical layer transmission circuit and the interface module, where the cable status detection module is configured to receive a notification notifying that the physical layer transmission circuit is in a disable state, and detect the status of the connection cable when the physical layer transmission circuit is in the disable state and generate a detection result of the connection cable.

Another embodiment of the invention provides a cable status detection method, which is adapted to a network connection device connected to a connection cable, where the network connection device is configured to send signals to the connection cable or receive signals from the connection cable, and the cable status detection method includes following steps. A notification notifying that a physical layer transmission circuit in the network connection device is in a disable state is received. When the physical layer transmission circuit is in the disable state, a cable status detection module configured in the network connection device detects a status of the connection cable, and generates a detection result of the connection cable.

According to the above descriptions, the physical layer transmission circuit used for transceiving signals in the network connection device can be disabled. When it is detected that the physical layer transmission circuit in the network connection device is in the disable state, the network connection device detects a status of the connected connection cable and then generates a detection result of the connection cable. In this way, the network connection device has both of a signal transmission ability and a connection cable status detection ability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
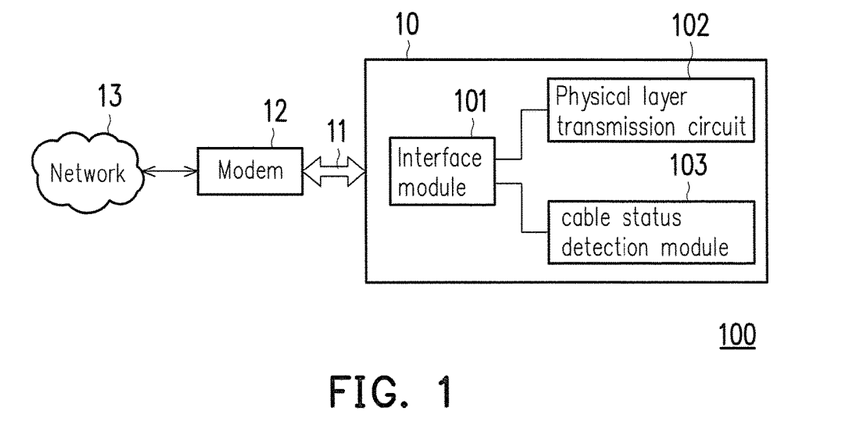
FIG. 1 is a schematic diagram of a network connection system according to an embodiment of the invention.

FIG. 1 is a schematic diagram of a network connection system according to an embodiment of the invention. Referring to FIG. 1, the network connection system 100 includes a network connection device 10, a connection cable 11, a modem 12 and a network 13.

The network connection device 10 is, for example, a physical connection interface, used for connecting the connection cable 11, such as a network interface card, etc. In the present embodiment, the network connection device 10 is, for example, a gigabit physical layer Ethernet chip. However, in another embodiment, the network connection device 10 can also be other type of physical connection interface. The connection cable 11 is a physical connection cable. For example, the connection cable 11 is a network cable used for transmitting signals, such network packets. In the present embodiment, one end of the connection cable 11 is connected to the network connection device 10, and another end of the connection cable 11 is connected to the modem 12. The modem 12 is a network communication device and is used for communicating with the network 13 in a wired and/or a wireless manner. In another embodiment, the modem 12 can also be a network communication device having an advanced network management function and/or a network sharing function such as a router, a switch or an access point (AP), etc. The network 13 can be a wired network, a wireless network or a combination thereof.

In the present embodiment, besides that the network connection device 10 can be connected to the modem 12 through the network cable 11 to communicate with the network 13, the network connection device 10 can also detect a status of the connected connection cable 11. In the following embodiments, it is assumed that the network connection device 10 is configured in a computer device. In this way, the network connection device 10 may access to power supply and can be connected to a processor of the computer device. After power is supplied to the network connection device 10, the computer device may communicate with the network 13 through the network connection device 10.

In the present embodiment, the network connection device 10 includes an interface module 101, a physical layer transmission circuit 102 and a cable status detection module 103. The interface module 101 is connected to the connection cable 11. For example, the interface module 101 can be electrically connected to or coupled to a physical slot (not shown) on the network connection device 10, and one end of the connection cable 11 can be inserted into the physical slot for communicating with the interface module 101. In an embodiment, the interface module 101 can also be referred to as an analog front end (AFE) circuit.

In an embodiment, the connection cable 11 includes at least one channel set. Each of the channel set includes an input channel and an output channel corresponding to the input channel. The input channel is used for receiving signals transmitted to the interface module 101 from the connection cable 11, and the output channel is used for transmitting signals from the interface module 101 to the connection cable 11.

The physical layer transmission circuit 102 is electrically connected to the interface module 101 and is configured to send signals to the connection cable 11 or receive signals from the connection cable 11 through the interface module 101. For example, the physical layer transmission circuit 102 may transform data to be transmitted to the network 13 into corresponding signal, and the interface module 101 may send the signal to the connection cable 11 in order to transmit the signal to the network 13 through the modem 12. Moreover, the physical layer transmission circuit 102 may also receive a signal coming from the network 13 through the modem 12, the connection cable 11 and the interface module 101, and transform the received signal into corresponding data. In an embodiment that the connection cable 11 includes a plurality of channel sets, the physical layer transmission circuit 102 may select a specific channel set from the channel sets to execute signal transmission. In an embodiment, the signal transmitted to the connection cable 11 by the physical layer transmission circuit 102 and the signal received from the connection cable 11 by the physical layer transmission circuit 102 are all referred to as a data signal. Moreover, in another embodiment, the data signal refers to a signal carrying bit data to be transmitted.

The cable status detection module 103 is electrically connected to the interface module 101 and the physical layer transmission circuit 102. The cable status detection module 103 is used for detecting a status of the connected connection cable 11 through the interface module 101. For example, after the connection cable 11 is correctly connected between a certain electronic device (for example, the modem 12) and the network connection device 10, the cable status detection module 103 transmits a detection pulse signal to the connection cable 11 through the interface module 101. The detection pulse signal is used for detecting the status (e.g., a connection status) of the connection cable 11. In case that the connection cable 11 is correctly connected, the connection cable 11 probably reflects at least a part of the detection pulse signal to the interface module 101, and the cable status detection module 103 may analyse the reflected signal to obtain the status of the connection cable 11. In an embodiment, the detection pulse signal used for detecting the status of the connection cable 11 can also be referred to as a testing signal. In an embodiment, the detection pulse signal is not used for transmitting data, so that the detection pulse signal does not carry bit data.

It should be noted that in the present embodiment, the cable status detection module 103 detects the status of the connection cable 11 (only) when the physical layer transmission circuit 102 is in a disable state, so as to avoid confusing the data signal of the physical layer transmission circuit 102 used for transmitting data and the detection pulse signal of the cable status detection module 103 used for detecting the status of the connection cable 11. For example, when the connection cable 11 is to be inspected, the physical layer transmission circuit 102 is disabled by a control circuit (for example, a processor) in the computer device configured with the cable status detection module 103 or the network connection device 10. Thereafter, when the physical layer transmission circuit 102 is disabled and is in the disable state, the cable status detection module 103 receives a notification notifying that the physical layer transmission circuit 102 is in the disable state from the physical layer transmission circuit 102 or the aforementioned control circuit. After receiving the notification notifying that the physical layer transmission circuit 102 is in the disable state, the cable status detection module 103 starts to detect the status of the connection cable 11 and generates a detection result of the connection cable 11. In other words, in the present embodiment, if the physical layer transmission circuit 102 is not in the disable state, the cable status detection module 103 does not perform the status detection on the connection cable 11. It should be noted that, the physical layer transmission circuit 102 not in the disable state refers to that the physical layer transmission circuit 102 is in a state capable of transceiving data signals in real-time (for example, an enable state or a normal working state).

In another embodiment, if the data signal of the physical layer transmission circuit 102 used for transmitting data and the detection pulse signal of the cable status detection module 103 used for detecting the status of the connection cable 11 can be effectively identified, the cable status detection module 103 may also perform such detection on the connection cable 11 when the physical layer transmission circuit 102 is not in the disable state. For example, the data signal of the physical layer transmission circuit 102 used for transmitting data and the detection pulse signal of the cable status detection module 103 used for detecting the status of the connection cable 11 can be interleavingly transmitted to the connection cable 11.

Figure 2:
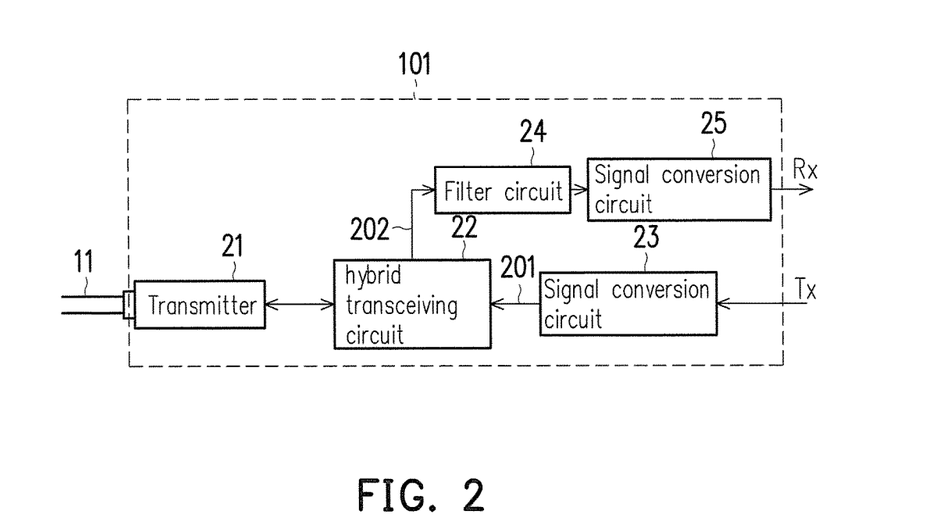
FIG. 2 is a schematic diagram of an interface module according to an embodiment of the invention.

FIG. 2 is a schematic diagram of an interface module according to an embodiment of the invention. Referring to FIG. 1 and FIG. 2, in the present embodiment, the interface module 101 includes a transmitter 21, a hybrid transceiving circuit 22, a signal conversion circuit 23, a filter circuit 24 and another signal conversion circuit 25. The hybrid transceiving circuit 22 is electrically connected to the transmitter 21, the signal conversion circuit 23 and the filter circuit 24. The signal conversion circuit 25 is electrically connected to the filter circuit 24.

In the present embodiment, the signal conversion circuit 23 may receive a signal (for example, a signal Tx) from the physical layer transmission circuit 102 or the cable status detection module 103. For example, if the signal Tx comes from the physical layer transmission circuit 102, the signal Tx is a data signal, and if the signal Tx comes from the cable status detection module 103, the signal Tx is a detection pulse signal. The signal conversion circuit 23 executes a digital-to-analog converting operation on the received signal and outputs the processed signal to the hybrid transceiving circuit 22. The hybrid transceiving circuit 22 receives the signal coming from the signal conversion circuit 23 and transmits the signal to the transmitter 21. The transmitter 21 transmits the signal coming from the hybrid transceiving circuit 22 to the connection cable 11.

On the other hand, the transmitter 21 receives a signal coming from the connection cable 11 and transmits the signal to the hybrid transceiving circuit 22. The hybrid transceiving circuit 22 transmits the signal coming from the transmitter 21 to the filter circuit 24. The filter circuit 24 performs a filtering operation on the signal coming from the hybrid transceiving circuit 22 and outputs the processed signal to the signal conversion circuit 25. The signal conversion circuit 25 executes an analog-to-digital converting operation on the signal coming from the filtering circuit 24, and outputs the processed signal (for example, a signal Rx) to the physical layer transmission circuit 102 or the cable status detection module 103.

In an embodiment, the hybrid transceiving circuit 22 further transmits the signal coming from the signal conversion circuit 23 to the filter circuit 24. In an embodiment, the hybrid transceiving circuit 22 transmits all of the signals coming from the signal conversion circuit 23 to the filter circuit 24. In another embodiment, the hybrid transceiving circuit 22 only transmits a part of the signals coming from the signal conversion circuit 23 to the filter circuit 24. For example, when the detection pulse signal is transmitted, the hybrid transceiving circuit 22 transmits the signal coming from the signal conversion circuit 23 to the filter circuit 24, and when the data signal is transmitted, the hybrid transceiving circuit 22 only transmits the signal coming from the signal conversion circuit 23 to the transmitter 21. In an embodiment, the hybrid transceiving circuit 22 may determine whether to transmit the signal coming from the signal conversion circuit 23 to the filter circuit 24 according to whether the physical layer transmission circuit 102 is in the disable state.

Figure 3:
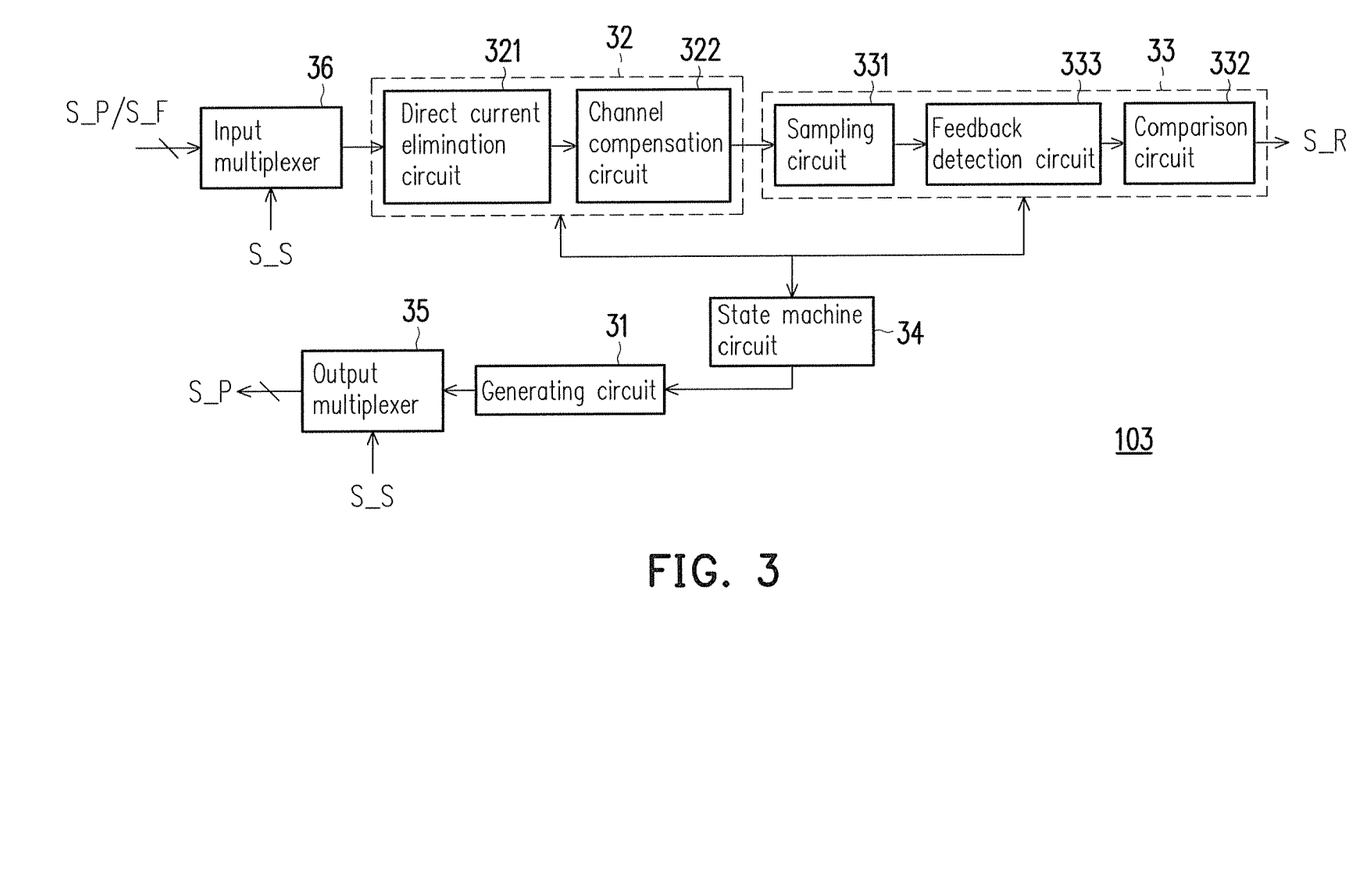
FIG. 3 is a schematic diagram of a cable status detection module according to an embodiment of the invention.

FIG. 3 is a schematic diagram of a cable status detection module according to an embodiment of the invention. Referring to FIG. 2 and FIG. 3, the cable status detection module 103 at least includes a generation circuit 31, a reception circuit 32 and a detection circuit 33. The generation circuit 31 is electrically connected to the interface module 101. The reception circuit 32 is electrically connected between the interface module 101 and the detection circuit 33.

In the present embodiment, the generation circuit 31 is used for generating a pulse signal S_P. For example, the pulse signal S_P can be regarded as the aforementioned detection pulse signal. The pulse signal S_P can be transmitted to the connection cable 11 through the interface module 101. For example, the pulse signal S_P is taken as the signal Tx and is input to the signal conversion circuit 23. The hybrid transceiving circuit 22 receives the pulse signal S_P through a transmission path (which is referred to as a first path 201 hereinafter) in internal of the interface module 101. For example, the signal conversion circuit 23 is located on the first path 201, as shown in FIG. 2. Then, the hybrid transceiving circuit 22 transmits the pulse signal S_P received from the first path 201 to the connection cable 11 through the transmitter 21.

In the present embodiment, the reception circuit 32 is used for receiving a feedback signal S_F fed back by the connection cable 11 in response to the pulse signal S_P. For example, when the connection cable 11 receives the detection pulse signal (i.e. the pulse signal S_P) from the transmitter 21, the connection cable 11 probably reflects at least a part of the pulse signal S_P back to the transmitter 21 according to a status of the connection cable 11. The feedback signal S_F refers to a signal reflected by the connection cable 11 based on the detection pulse signal. The hybrid transceiving circuit 22 receives the feedback signal S_F through the transmitter 21. Then, the hybrid transceiving circuit 22 transmits the feedback signal S_F to the reception circuit 32 through another conduction path (which is referred to as a second path 202 hereinafter) in internal of the interface module 101. For example, the filter circuit 24 and the signal conversion circuit 25 are all located on the second path 202, as shown in FIG. 2. Then, the feedback signal S_F can be regarded as the signal Rx for transmitting to the reception circuit 32.

In an embodiment, the pulse signal S_P generated by the generation circuit 31 can also be transmitted to the reception circuit 32 through the interface module 101. For example, when the hybrid transceiving circuit 22 receives the pulse signal S_P through the first path 201, the hybrid transceiving circuit 22 may further route the pulse signal S_P on the first path 201 to the second path 202 for transmitting the pulse signal S_P to the reception circuit 32. For example, in an embodiment, the hybrid transceiving circuit 22 first routes the pulse signal S_P coming from the signal conversion circuit 23 to the second path 202. Then, when the hybrid transceiving circuit 22 receives the feedback signal S_F from the transmitter 21, the hybrid transceiving circuit 22 may route the feedback signal S_F coming from the transmitter 21 to the second path 202.

In the present embodiment, the reception circuit 32 includes a direct current (DC) elimination circuit 321 and a channel compensation circuit 322. The DC elimination circuit 321 is connected in series with the channel compensation circuit 322. The DC elimination circuit 321 is used for executing a DC bias elimination on the received signal. The channel compensation circuit 322 is used for executing a channel compensation on the received signal. In another embodiment, the reception circuit 32 may also include only one of the DC elimination circuit 321 and the channel compensation circuit 322. In another embodiment, the reception circuit 32 may further include other reception circuits (for example, various filters, etc.). In this way, the reception circuit 32 may execute various signal processing operations such as the DC bias elimination, the channel compensation and/or signal amplification, etc. on the received signal (for example, the pulse signal S_P and the feedback signal S_F) and output the processed signal to the detection circuit 33.

In the present embodiment, the detection circuit 33 is used for detecting a difference between the pulse signal S_P and the feedback signal S_F. For example, the detection circuit 33 may detect a difference between the pulse signal S_P received by the reception circuit 32 through the interface module 101 and the feedback signal S_F. In another embodiment, the detection circuit 33 may also directly receive the pulse signal S_P from the generation circuit 31 without through the interface module 101. For example, the detection circuit 33 may directly receive the pulse signal S_P from the generation circuit 31 through a specific transmission path (not shown) in internal of the cable status detection module 103. The detection circuit 33 generates a detection result S_R of the connection cable 11 according to the difference between the pulse signal S_P and the feedback signal S_F. For example, the detection result S_R is used for representing one of the status, such as a short circuit status, an open circuit status, a un-match status and a match status. In an embodiment, the aforementioned "match" refers to that an impendence (about 100 ohm) of the connection cable 11 is complied with an impedance between the connection cable 11 and the network connection device 10 or an impendence between the connection cable 11 and the modem 12, and otherwise refers to "un-match".

In an embodiment, if the status of the connection cable 11 is one of the "open circuit" and the "short circuit", an amplitude of the received feedback signal S_F and an amplitude of the pulse signal S_P are relatively close. Further, if a phase of the feedback signal S_F is the same with a phase of the pulse signal S_P, it can be determined that the status of the connection cable 11 is "open circuit". Conversely, if the phase of the feedback signal S_F is inverted to the phase of the pulse signal S_P, it can be determined that the status of the connection cable 11 is "short circuit".

In an embodiment, if the status of the connection cable 11 is "match", it represents that the signal transmission quality of the connection cable 11 is good. For example, when the amplitude of the received feedback signal S_F is small enough to be almost ignored relative to the amplitude of the pulse signal S_P, or none of valid feedback signal is detected, it can be determined that the status of the connection cable 11 is "match". In an embodiment, besides the aforementioned status of "open circuit", "short circuit" and "match", the other abnormal status are all regarded as the "un-match". In another embodiment, the detection result of the connection cable 11 can also be any customized result.

In the present embodiment, the detection circuit 33 includes a sampling circuit 331 and a comparison circuit 332. The comparison circuit 332 is electrically connected to the sampling circuit 331. The sampling circuit 331 is configured to sample the pulse signal S_P coming from the reception circuit 32 to obtain a sampling value of the pulse signal S_P (which is also referred to as a pulse sampling value hereinafter) and sample the feedback signal S_F coming from the reception circuit 32 to obtain a sampling value of the feedback signal S_F (which is also referred to as a feedback sampling value hereinafter).

In the present embodiment, the pulse sampling value may reflect the amplitude and the phase of the pulse signal S_P, and the feedback sampling value may reflect the amplitude and the phase of the feedback signal S_F. For example, the amplitude of a signal may correspond to a peak voltage (or a sampling voltage) of the signal, and the phase of the signal may correspond to positive or negative of the amplitude of the signal. For example, if a pulse sampling value of a certain signal is "+1" volt, the sign "+" represents that the phase of the signal is positive, and "1" represents the amplitude of the signal. Alternatively, if a pulse sampling value of a certain signal is "−0.6" volt, the sign "−" represents that the phase of the signal is negative, and "0.6" represents the amplitude of the signal. Moreover, in another embodiment, the aforementioned pulse sampling value may only include the portion of amplitude without including the sign representing the phase.

According to the sampling result of the sampling circuit 331, the comparison circuit 332 may compare the pulse sampling value of the pulse signal S_P and the feedback sampling value of the feedback signal S_F. For example, in an embodiment, the comparison circuit 332 may output the corresponding detection result S_R according to a ratio between the pulse sampling value and the feedback sampling value. For example, the comparison circuit 332 may calculate the ratio according to the following equation (1).

$$V_R/V_I = \rho \qquad (1)$$

Where $V_R$ is the feedback sampling value of the feedback signal S_F, $V_I$ is the pulse sampling value of the pulse signal S_P, and $\rho$ is the aforementioned ratio. According to the equation (1), if the amplitudes of the pulse signal S_P and the feedback signal S_F are close to each other and the phases thereof are the same, the value of $\rho$ approaches "1"; if the amplitudes of the pulse signal S_P and the feedback signal S_F are close to each other and the phases thereof are inverted to each other, the value of $\rho$ approaches "−1"; and if the amplitude of the feedback signal S_F is small enough to be almost negligible relative to the amplitude of the pulse signal S_P, the value of $\rho$ approaches "0".

In the present embodiment, if the calculated value of $\rho$ approaches "1", the comparison circuit 332 may output the detection result S_R representing the status of the connection cable 11 is "open circuit". If the calculated value of $\rho$ approaches "−1", the comparison circuit 332 may output the detection result S_R representing the status of the connection cable 11 is "short circuit". If the calculated value of $\rho$ approaches "0", the comparison circuit 332 may output the detection result S_R representing the status of the connection cable 11 is "match". If the calculated value of $\rho$ does not approach "1", "−1" or "0", the comparison circuit 332 may output the detection result S_R representing the status of the connection cable 11 is "un-match".

In an embodiment, a first value can be set to determine whether the value of $\rho$ approaches "1", a second value can be set to determine whether the value of $\rho$ approaches "−1", and a value range can be set to determine whether the value of $\rho$ approaches "0". For example, the first value is "0.8", the second value is "−0.8", and the value range is "0.1" to "−0.1". Namely, if the calculated value of $\rho$ is greater than "0.8" (for example, the calculated value of $\rho$ is between "0.8" and "1"), it is determined that the calculated value of $\rho$ approaches "1"; if the calculated value of $\rho$ is smaller than "−0.8" (for example, the calculated value of $\rho$ is between "−0.8" and "−1"), it is determined that the calculated value of $\rho$ approaches "−1"; if the calculated value of $\rho$ is between "0.1" and "−0.1", it is determined that the calculated value of ρ approaches "0"; and if the calculated value of ρ is not greater than "0.8", not smaller than "−0.8" and not between "0.1" and "−0.1", it is determined that the calculated value of ρ does not approach any one of "1", "−1" and "0".

In an embodiment, the phase of the sampled pulse signal S_P is also referred to as a pulse sampling phase, and the phase of the sampled feedback signal S_F is also referred to as a feedback sampling phase. If the pulse sampling phase is the same with the feedback sampling phase, according to the aforementioned equation (1), the calculated value of ρ is greater than "0". If the pulse sampling phase is inverted to the feedback sampling phase, according to the aforementioned equation (1), the calculated value of ρ is smaller than "0".

Besides that the status of the connection cable 11 is determined according to the value of ρ of the aforementioned equation (1), in another embodiment, the comparison circuit 332 may also determine whether an amplitude difference between the pulse signal S_P and the feedback signal S_F is smaller than a threshold according to the pulse sampling value and the feedback sampling value, and determine whether the pulse signal S_P is inverted (or non-inverted) to the feedback signal S_F according to the pulse sampling phase and the feedback sampling phase. According to whether the amplitude difference between the pulse signal S_P and the feedback signal S_F is smaller than the threshold and whether the pulse signal S_P is inverted (or non-inverted) to the feedback signal S_F, the comparison circuit 332 may output the corresponding detection result S_R.

For example, in an embodiment, if the amplitude difference between the pulse signal S_P and the feedback signal S_F is smaller than the threshold and the pulse signal S_P is non-inverted to the feedback signal S_F (similar to the situation that the value of ρ approaches "1"), the comparison circuit 332 may output the detection result S_R representing the status of "open circuit". If the amplitude difference between the pulse signal S_P and the feedback signal S_F is smaller than the threshold and the pulse signal S_P is inverted to the feedback signal S_F (similar to the situation that the value of ρ approaches "−1"), the comparison circuit 332 may output the detection result S_R representing the status of "short circuit". If the amplitude difference between the pulse signal S_P and the feedback signal S_F is greater than the threshold and the amplitude of the feedback signal S_F does not approach "0" (similar to the situation that the value of ρ does not approach any one of "1", "−1" and "0"), the comparison circuit 332 may output the detection result S_R representing the status of "un-match". Moreover, if the amplitude of the feedback signal S_F approaches "0" (similar to the situation that the value of ρ approaches "0"), the comparison circuit 332 may output the detection result S_R representing the status of "match".

In an embodiment, whether the amplitude of a feedback signal approaches "0" can be determined according to whether the feedback signal is a valid feedback signal. For example, if a feedback signal is a valid feedback signal, it is determined that the amplitude of the feedback signal does not approach "0". Conversely, if a feedback signal is not a valid feedback signal, it is determined that the amplitude of the feedback signal approaches "0". In an embodiment, a predetermined value can be set to determine whether a certain feedback signal is a valid feedback signal. For example, if the amplitude of a certain feedback signal is greater than the predetermined value, the feedback signal is regarded as a valid feedback signal, and if the amplitude of a certain feedback signal is not greater than the predetermined value, the feedback signal is regarded as an invalid feedback signal.

Figure 4:
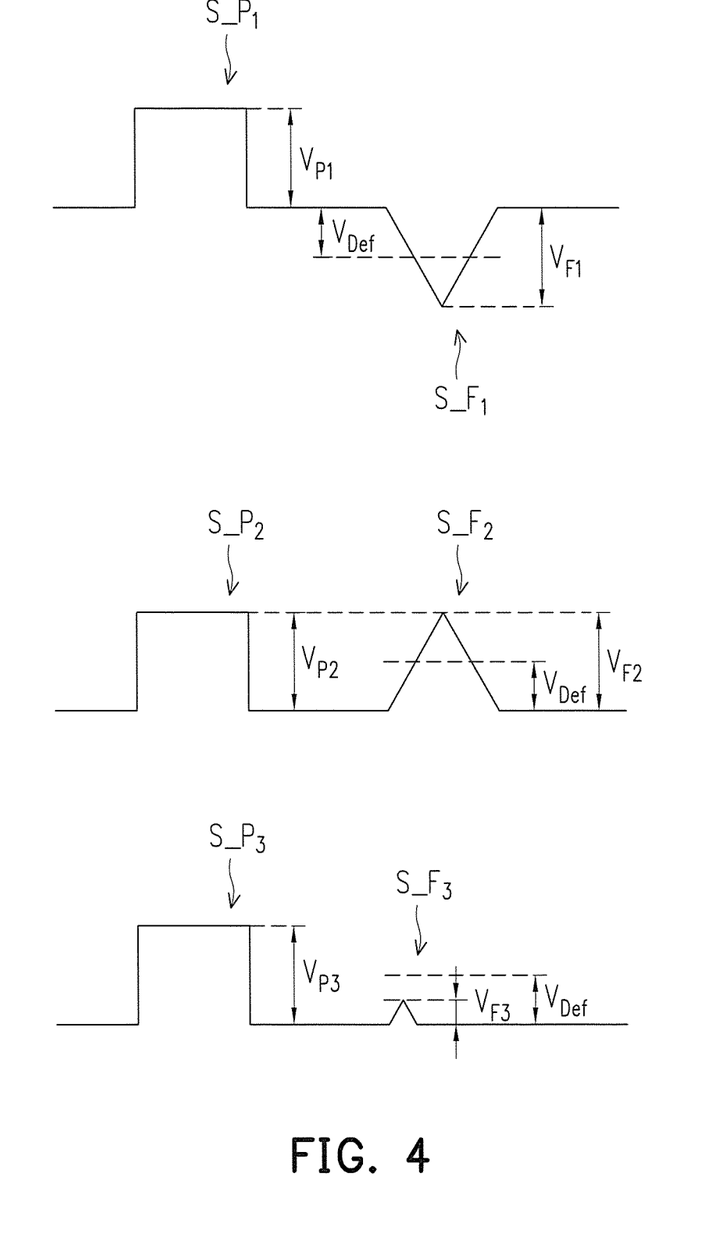
FIG. 4 is a schematic diagram of a pulse signal and a feedback signal according to an embodiment of the invention.

FIG. 4 is a schematic diagram of a pulse signal and a feedback signal according to an embodiment of the invention.

Referring to FIG. 4, a pulse signal $S\_P_1$ and a feedback signal $S\_F_1$ are sequentially received. The amplitude (i.e., a voltage $V_{F1}$) of the feedback signal $S\_F_1$ is greater than a predetermined value $V_{Def}$. The amplitude of the feedback signal $S\_F_1$ and the amplitude (i.e., a voltage $V_{P1}$) of the pulse signal $S\_P_1$ are equivalent (for example, a difference value between $V_{F1}$ and $V_{P1}$ is smaller than a threshold). The feedback signal $S\_F_1$ is inverted to the pulse signal $S\_P_1$. Therefore, the comparison circuit 332 generates the detection result S_R representing the status of "short circuit".

Alternatively, a pulse signal $S\_P_2$ and a feedback signal $S\_F_2$ are sequentially received. The amplitude (i.e., a voltage $V_{F2}$) of the feedback signal $S\_F_2$ is greater than the predetermined value $V_{Def}$. The amplitude of the feedback signal $S\_F_2$ and the amplitude (i.e. a voltage $V_{P2}$) of the pulse signal $S\_P_2$ are equivalent (for example, a difference value between $V_{F2}$ and $V_{P2}$ is smaller than a threshold). The feedback signal $S\_F_2$ is non-inverted to the pulse signal $S\_P_2$. Therefore, the comparison circuit 332 generates the detection result S_R representing the status of "open circuit".

Alternatively, a pulse signal $S\_P_3$ and a feedback signal $S\_F_3$ are sequentially received. The amplitude (i.e. a voltage $V_{F3}$) of the feedback signal $S\_F_3$ is far smaller than the amplitude (i.e. a voltage $V_{P3}$) of the pulse signal $S\_P_3$. Even more, the amplitude of the feedback signal $S\_F_3$ is not greater than the predetermined value $V_{Def}$. Therefore, the comparison circuit 332 generates the detection result S_R representing the status of "match".

In another embodiment of FIG. 4, if the amplitude difference between the feedback signal $S\_F_1$ and the pulse signal $S\_P_1$ is greater than a threshold, the comparison circuit 332 generates the detection result S_R representing the status of "un-match". Alternatively, if the amplitude difference between the feedback signal $S\_F_2$ and the pulse signal $S\_P_2$ is greater than a threshold, the comparison circuit 332 also generates the detection result S_R representing the status of "un-match".

Referring back to FIG. 3, in an embodiment, the cable status detection module 10 further includes a state machine circuit 34. The state machine circuit 34 is electrically connected to the generation circuit 31, the reception circuit 32 and the detection circuit 33. The state machine circuit 34 activates a counter in response to the transmission (or generation) of the pulse signal S_P, and determines whether the reception circuit 32 receives the feedback signal S_F within a time range. For example, the time range refers to a time period started when the counter is activated. If the reception circuit 32 receives the feedback signal S_F within the time range, the detection circuit 33 may execute the aforementioned sampling operation and comparison operation and then generate the detection result. Comparatively, if the reception circuit 32 does not receive the feedback signal S_F within the time range, the state machine circuit 34 may instruct the detection circuit 33 (for example, the comparison circuit 332) to directly output a predetermined detection result. For example, the predetermined detection result corresponds to the situation that the value of ρ approaches "0" and represents the status of the connection cable 11 is "match". Moreover, the aforementioned "directly output" refers to the operation of directly generating the predetermined detection result by the detection circuit 33 by skipping the aforementioned comparison operation. In other words, in the present embodiment, if the signal transmission quality of the connection cable 11 is good, the result signal S_R representing the status of "match" can be directly generated, so as to mitigate a problem of timeout generated due to an excessive long time for waiting the feedback signal by the cable status detection module 103.

Referring to FIG. 3, in an embodiment, the detection circuit 33 further includes a feedback detection circuit 333. The feedback detection circuit 333 is connected in series between the sampling circuit 331 and the comparison circuit 332. The feedback detection circuit 333 is used for determining whether a feedback sampling value generated by the sampling circuit 331 is greater than a predetermined value. For example, if the feedback sampling value of a certain feedback signal is greater than the predetermined value, the feedback signal is regarded as a valid feedback signal. Conversely, if the feedback sampling value of a certain feedback signal is not greater than the predetermined value, the feedback signal is regarded as an invalid feedback signal. In an embodiment, to determine whether a valid feedback signal is received can be more effective than purely determining whether any feedback signal is received. In an embodiment, the comparison circuit 332 may only compare the pulse sampling value with the feedback sampling value which is greater than the aforementioned predetermined value. In other words, the comparison circuit 332 only performs comparison operation on the valid feedback signal.

In an embodiment, if the feedback detection circuit 333 determines that a certain feedback sampling value generated by the sampling circuit 331 is greater than the predetermined value (i.e. the feedback signal corresponding to the feedback sampling value is a valid feedback signal), the feedback detection circuit 333 sends a notification to the state machine circuit 34. If the state machine circuit 34 receives the notification from the feedback detection circuit 333 within the aforementioned time range, the state machine circuit 34 waits for the comparison circuit 332 to execute the aforementioned comparison operation and the operation of generating the detection result. Conversely, if the state machine circuit 34 does not receive the notification from the feedback detection circuit 333 within the aforementioned time range, it represents that none valid feedback signal is received within the aforementioned time range, and then the state machine circuit 34 instructs the detection circuit 33 to directly output the aforementioned predetermined detection result.

Referring to FIG. 3 again, in an embodiment, the cable status detection module 103 further includes an output multiplexer 35 and an input multiplexer 36. An input terminal of the output multiplexer 35 is electrically connected to the generation circuit 31, and an output terminal of the output multiplexer 35 is electrically connected to a plurality of output channels. For example, each of the output channels of the output multiplexer 35 is connected to an output channel of the connection cable 11. An input terminal of the input multiplexer 36 is electrically connected to a plurality of input channels, and an output terminal of the input multiplexer 36 is electrically connected to the reception circuit 32. For example, each of the input channels of the input multiplexer 36 is used for connecting an input channel of the connection cable 11.

In the present embodiment, the state machine circuit 34 determines a certain channel set to be currently inspected in the connection cable 11. It is assumed that a first channel set in a plurality of channel sets of the connection cable 11 is to be currently inspected, the output multiplexer 35 transmits the received pulse signal S_P to a certain output channel at the output terminal thereof in response to a selection signal S_S. The output channel is connected to a first output channel in the first channel set. In this way, the pulse signal S_P is transmitted to the first output channel of the connection cable 11. According to the status of the connection cable 11, one feedback signal S_F is probably transmitted back from a first input channel corresponding to the first output channel in the first channel set. The input multiplexer 36 may receive the feedback signal S_F from a certain input channel connected to the first input channel in the input terminal thereof in response to the selection signal S_S. After the feedback signal S_F is received, the input multiplexer 36 transmits the feedback signal S_F to the reception circuit 32.

In an embodiment that the connection cable 11 includes a plurality of channel sets, each of the channel sets of the connection cable can be sequentially inspected. For example, after a detection result S_R corresponding to a certain channel set of the connection cable 11 is generated, the state machine circuit 34 may control to inspect a next channel set of the connection cable 11 by using the selection signal S_S. Moreover, the state machine circuit 34 may also select to inspect only a part of the channel sets in the connection cable 11. Alternatively, in another embodiment, the corresponding detection result S_R can be generated after the inspection of all of the channel sets in the connection cable 11 is completed.

In an embodiment, a sampling clock used by the sampling circuit 331 can be adjusted corresponding to a length of the connection cable 11. The sampling clock is used for sampling the pulse signal S_P and the feedback signal S_F. In an embodiment, a minimum value of a frequency of the sampling clock used by the sampling circuit 331 is negatively correlated to the length of the connection cable 11 to be inspected. In an embodiment, if an inspection of a connection cable with a longer length is changed to an inspection of another connection cable with a shorter length, the frequency of the sampling clock used by the sampling circuit 331 is changed from a first frequency to a second frequency, where the second frequency is greater than the first frequency. For example, if the length of the connection cable 11 is 1 meter, a time interval between rising edges of any two continuous pulse waves in the sampling clock used by the sampling circuit 331 is preferably smaller than or equal to 10.1 ns; and if the length of the connection cable 11 is 200 meters, a time interval between rising edges of any two continuous pulse waves in the sampling clock used by the sampling circuit 331 is preferably smaller than or equal to 2020.2 ns. In this way, a probability of unable to sample a peak of the pulse signal S_P or the feedback signal S_F due to excessive long time interval between two continuous samplings can be reduced.

In an embodiment, the state machine circuit 34 is further used for controlling a detection procedure of the cable status detection module 103. For example, when the notification notifying that the physical layer transmission circuit 102 is in the disable state is received, the state machine circuit 34 may instruct the generation circuit 31 to generate the pulse signal S_P to start the detection procedure for detecting the status of the connection cable 11.

In an embodiment, after a status of the connection cable 11 is detected by using the pulse signal S_P with a certain amplitude value (which is also referred to as a first amplitude value hereinafter), the cable status detection module 103 further uses another pulse signal S_P with different amplitude value (which is also referred to as a second amplitude value hereinafter) to again detect the status of the same connection cable 11, where the second amplitude value is smaller than the first amplitude value. In an embodiment, the second amplitude value can be set as a half of the first amplitude value. For example, the amplitude value of the pulse signal S_P can be instructed by the state machine circuit 34. The method of detecting the status of the connection cable 11 by using the pulse signal S_P with a certain amplitude value has been described in the aforementioned description, and detail thereof is not repeated. A detection result (which is also referred to as a second detection result) of the detection procedure executed by using the pulse signal S_P with the second amplitude value can be used to update a detection result (which is also referred to as a first detection result) of the detection procedure executed by using the pulse signal S_P with the first amplitude value.

After the second detection result is obtained, the cable status detection module 103 (for example, the state machine circuit 34) may determine whether the first detection result and the second detection result are the same. For example, if the first detection result and the second detection result all represent that the status of the connection cable 11 is one of the short circuit status, the open circuit status, the match status and the un-match status, it represents that the first detection result and the second detection result are the same. Conversely, it represents that the first detection result and the second detection result are different. If the first detection result and the second detection result are the same, the cable status detection module 103 may output one of the first detection result and the second detection result. Conversely, if the first detection result and the second detection result are different, the cable status detection module 103 may update the detection result of the connection cable 11 to the second detection result and output the updated detection result.

In an embodiment, to use the pulse signal S_P with the first amplitude value to inspect the connection cable 11 with a shorter length and/or the connection cable 11 with a faster signal reflection speed probably results in a fact that the pulse signal S_P and the feedback signal S_F received by the cable status detection module 103 are at least partially overlapped, and the subsequent sampling and comparison operations may have abnormity. Therefore, by decreasing the amplitude value of the pulse signal S_P to again execute the inspection, even if the received pulse signal S_P and the feedback signal S_F are overlapped, the sampling result can be accurately analysed. For example, in an embodiment, a detection procedure executed by using the pulse signal S_P with the first amplitude value is referred to as a first detection procedure, and a detection procedure executed by using the pulse signal S_P with the second amplitude value is referred to as a second detection procedure. In the first detection procedure, the comparison circuit 332 may use a first rule to generate the first detection result. In the second detection procedure, the comparison circuit 332 may use a second rule to generate the second detection result, where the second rule is different to the first rule. For example, compared with the first rule, the pattern of signal overlap is further considered in the second rule.

Figure 5:
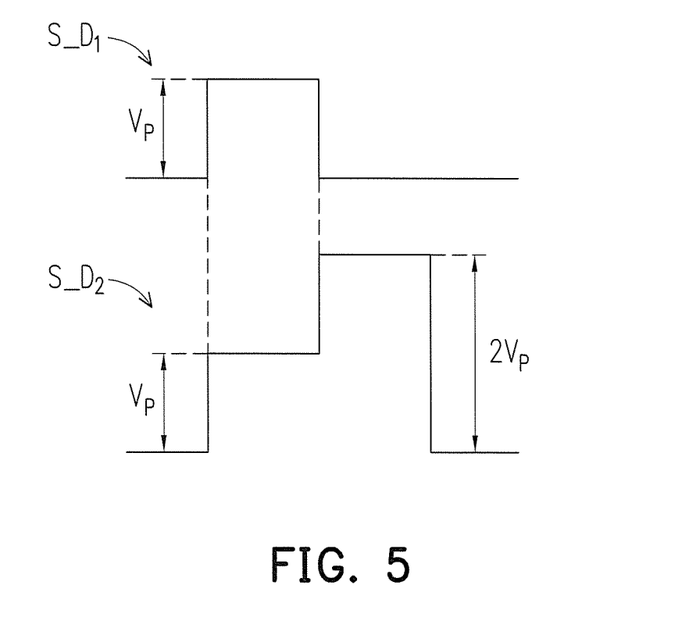
FIG. 5 is a schematic diagram of a pulse signal and a feedback signal according to another embodiment of the invention.

FIG. 5 is a schematic diagram of a pulse signal and a feedback signal according to another embodiment of the invention.

Referring to FIG. 5, in the second detection procedure, if the received signal is an overlapped signal S_D$_1$, the comparison circuit 332 may identify it and then generate the detection result S_R representing the status of "short circuit" according to the second rule. Alternatively, if the received signal is an overlapped signal S_D$_2$, the comparison circuit 332 may identify it and then generate the detection result S_R representing the status of "open circuit" according to the second rule. The maximum amplitude of the overlapped signal S_D$_1$ is $V_P$, and the maximum amplitude of the overlapped signal S_D$_2$ is $2V_P$. The overlapped signal S_D$_1$ corresponds to partial overlap between the inverted pulse signal S_P and the feedback signal S_F, and the overlapped signal S_D$_2$ corresponds to partial overlap between the non-inverted pulse signal S_P and the feedback signal S_F. In the second detection procedure, the amplitude of the adopted pulse signal S_P is $V_P$. Compared to the embodiment of FIG. 4, the amplitude $V_P$ in FIG. 5 is smaller than the amplitudes $V_{P1}$, $V_{P2}$ and $V_{P3}$ in FIG. 4.

Figure 6:
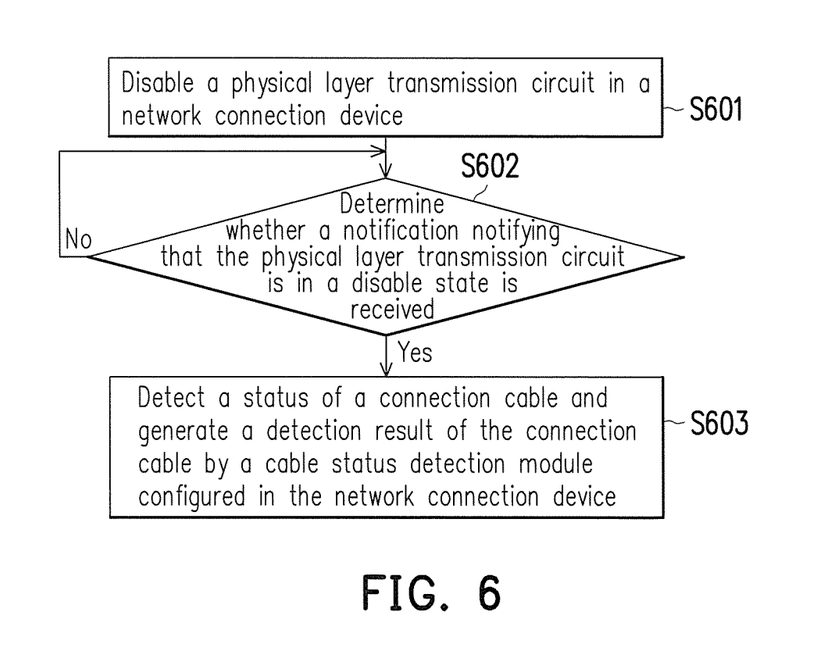
FIG. 6 is a flowchart illustrating a cable status detection method according to an embodiment of the invention.

FIG. 6 is a flowchart illustrating a cable status detection method according to an embodiment of the invention. Referring to FIG. 6, in step S601, a physical layer transmission circuit in a network connection device is disabled. In step S602, it is determined whether a notification notifying that the physical layer transmission circuit is in a disable state is received. If it is determined that the notification is not received, the step S602 is repeatedly executed. If it is determined that the notification is received, in step S603, a cable status detection module configured in the network connection device detects the status of the connection cable and then generates a detection result of the connection cable.

Figure 7:
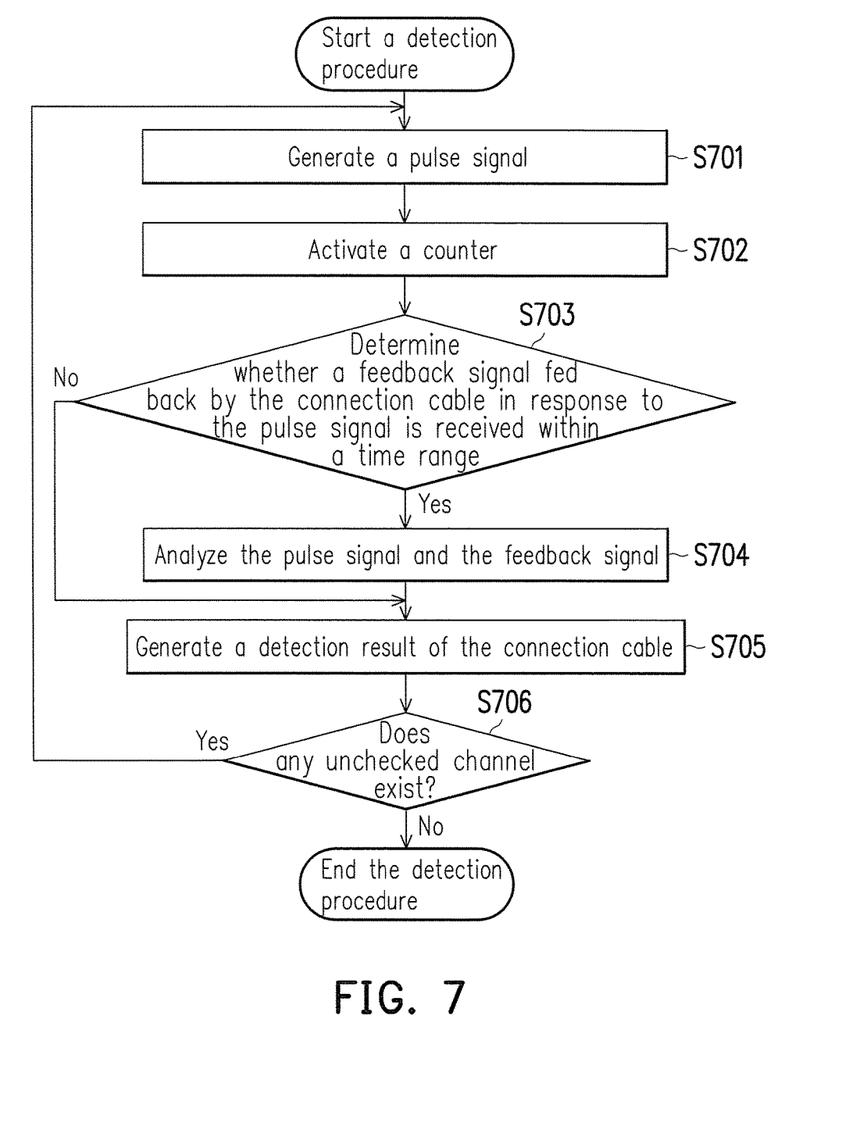
FIG. 7 is a flowchart illustrating a cable status detection method according to another embodiment of the invention.

FIG. 7 is a flowchart illustrating a cable status detection method according to another embodiment of the invention. Referring to FIG. 7, in step S701, a pulse signal used for detecting a status of a connection cable is generated. In step S702, a counter is activated. In step S703, it is determined whether a feedback signal fed back by the connection cable in response to the pulse signal is received within a time range. If it is determined that the feedback signal fed back by the connection cable in response to the pulse signal is not received within the time range, step S705 is directly executed. If it is determined that the feedback signal fed back by the connection cable in response to the pulse signal is received within the time range, in step S704, the pulse signal and the feedback signal are analysed. In step S705, a detection result of the connection cable is generated according to an analysis result. In an embodiment of FIG. 7, the step S703 is, for example, to determine whether a valid feedback signal is received. For example, the amplitude of the valid feedback signal is greater than a predetermined value. In step S706, it is determined whether any unchecked channel exists. Here, the aforementioned channel refers to a channel (or a channel set) in the connection cable. If it is determined that an unchecked channel exists, the step S701 is repeatedly executed. For example, in the repeatedly executed step S701, the detection procedure is performed on another channel (or a channel set) in the connection cable. Moreover, if it is determined that all of the channels have been checked, the detection procedure is ended.

Figure 8:
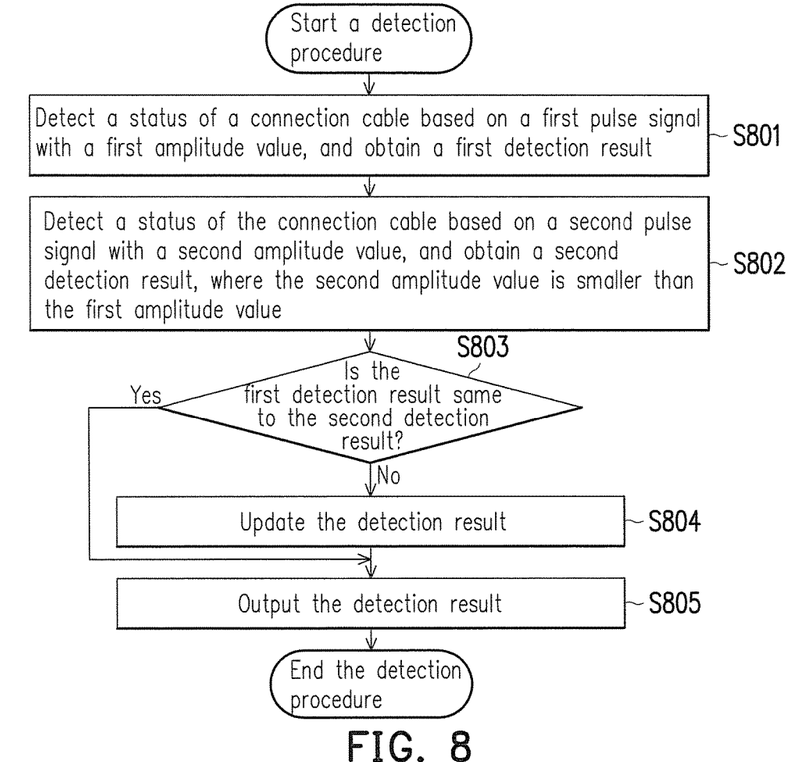
FIG. 8 is a flowchart illustrating a cable status detection method according to another embodiment of the invention.

FIG. 8 is a flowchart illustrating a cable status detection method according to another embodiment of the invention. Referring to FIG. 8, in step S801, a status of a connection cable is detected based on a first pulse signal with a first amplitude value, and a first detection result is obtained. In step S802, a status of the connection cable is detected based on a second pulse signal with a second amplitude value, and a second detection result is obtained, where the second amplitude value is smaller than the first amplitude value. In step S803, it is determined whether the first detection result and the second detection result are the same. If yes, a step S805 is directly executed, and if not, in step S804, the second detection result obtained in the step S802 is used to update the first detection result obtained in the step S801. In the step S805, a detection result of the connection cable 11 is output.

Figure 9:
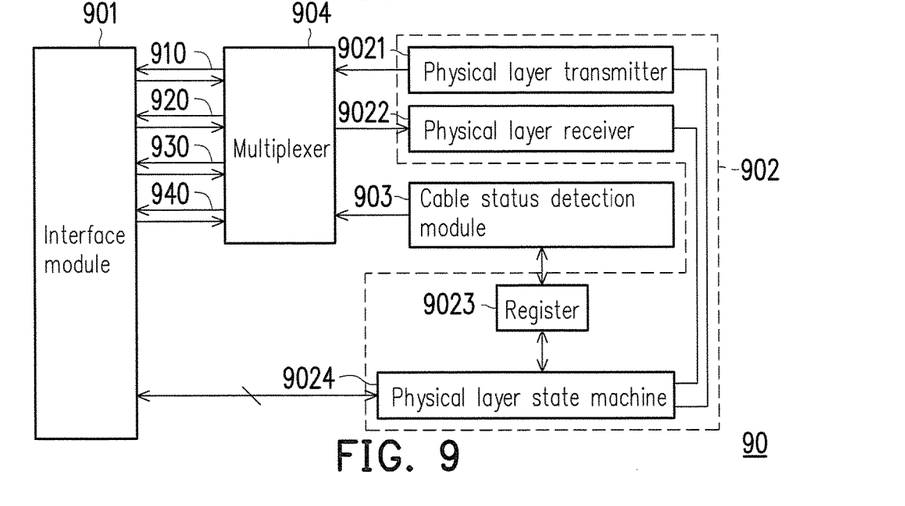
FIG. 9 is a schematic diagram of a network connection device according to another embodiment of the invention.

FIG. 9 is a schematic diagram of a network connection device according to another embodiment of the invention.

Referring to FIG. 9, the network connection device 90 includes an interface module 901, a physical layer transmission circuit 902, a cable status detection module 903 and a multiplexer 904.

In the present embodiment, the physical layer transmission circuit 902 includes a physical layer transmitter 9021, a physical layer receiver 9022, a register 9023 and a physical layer state machine 9024. The physical layer transmitter 9021 is used for sending data signal to a connection cable (for example, the connection cable 11 of FIG. 1) through the interface module 901. The physical layer receiver 9022 is used for receiving data signal from the connection cable through the interface module 901.

The register 9023 is used for recording related information for transmitting the data signal and the detection pulse signal. For example, the register 9023 may record information related to a current state (for example, an enable state or a disable state) of the physical layer transmission circuit 902, information related to a current state (for example, an enable state or a disable state) of the cable status detection module 903, information related to whether the connection cable is connected, information related to the amplitude and frequency of the detection pulse signal and/or information related to which one of the channel sets 910-940 is checked currently, etc. The physical layer receiver 9022 and the cable status detection module 903 may all access the register 9023.

The physical layer state machine 9024 is used for controlling the interface module 901, the physical layer transmitter 9021, the physical layer receiver 9022 and the register 9023. For example, the physical layer state machine 9024 may send various parameter information to the interface module 901 for various usages.

One end of the multiplexer 904 is connected to the plurality of channel sets 910-940. Each of the channel sets 910-940 are used for connecting one channel set of the connection cable. Another end of the multiplexer 904 is connected to the physical layer transmitter 9021, the physical layer receiver 9022 and the cable status detection module 903. When a data signal is to be transmitted, the multiplexer 904 may turn on a certain channel set of the connection cable to facilitate communication between the connection cable and the physical layer transmitter 9021 or the physical layer receiver 9022. When a certain detection procedure is to be performed on the connection cable, the multiplexer 904 may turn on a certain channel set of the connection cable to facilitate the cable status detection module 903 to detect the status of the turned on channel set.

It should be noted that the structure of the network connection device 90 mentioned in the exemplary embodiment of FIG. 9 is only an example, and such structure can be adjusted in an actual practise according to different types and/or functions of the connection device. Moreover, the various steps/flows in the exemplary embodiments of FIG. 6 to FIG. 8 can be used in collaboration with the exemplary embodiments of FIG. 1 to FIG. 7 and FIG. 9 or used independently.

In summary, in an embodiment of the invention, when a certain connection cable connected to the network connection device is to be inspected, the physical layer transmission circuit used for transceiving data signals in the network connection device is disabled. Thereafter, when it is detected that the physical layer transmission circuit in the network connection device is in the disable state, the network connection device detects the status of the connection cable and generates a detection result of the connection cable. In this way, the network connection device has both of a signal transmission function and a cable status detection function. Moreover, the network connection device may inspect a plurality of channels in the connection cable one-by-one or only check a certain channel in the connection cable.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A network connection device comprising:
   an interface module, configured to connect a connection cable;
   a physical layer transmission circuit, coupled to the interface module and configured to send signal to the connection cable or receive signal from the connection cable through the interface module; and
   a cable status detection module, coupled to the physical layer transmission circuit and the interface module,
   wherein the cable status detection module is configured to receive a notification notifying that the physical layer transmission circuit is in a disable state,
   wherein the cable status detection module is configured to detect a status of the connection cable when the physical layer transmission circuit is in the disable state and generate a detection result of the connection cable,
   wherein the cable status detection module comprises a reception circuit which is coupled to the interface module and configured to receive a first feedback signal from the connection cable in response to a first pulse signal,
   wherein the reception circuit comprises:
   a direct current elimination circuit, configured to execute direct current bias elimination on the first feedback signal; and
   a channel compensation circuit, coupled to the direct current elimination circuit and configured to execute channel compensation on the first feedback signal.

2. The network connection device as claimed in claim 1, wherein the cable status detection module further comprises:
   a generation circuit, coupled to the interface module and configured to generate the first pulse signal, wherein the first pulse signal is transmitted to the connection cable through the interface module; and
   a detection circuit, coupled to the reception circuit, and configured to detect a first difference between the first pulse signal and the first feedback signal, and generate the detection result according to the first difference.

3. The network connection device as claimed in claim 2, wherein the first pulse signal is further transmitted to the reception circuit through the interface module, and the detection circuit detects the first difference between the first pulse signal received by the reception circuit and the first feedback signal.

4. The network connection device as claimed in claim 3, wherein the interface module comprises a hybrid transceiving circuit,
   wherein the hybrid transceiving circuit is configured to receive the first pulse signal generated by the generation circuit through a first path, and transmit the received first pulse signal to the connection cable, wherein the hybrid transceiving circuit is further configured to receive the first feedback signal from the connection cable, and transmit the received first feedback signal to the reception circuit through a second path.

5. The network connection device as claimed in claim 4, wherein the hybrid transceiving circuit is further configured to route the first pulse signal on the first path to the second path.

6. The network connection device as claimed in claim 2, wherein the connection cable comprises a plurality of channel sets, wherein a first channel set in the channel sets comprises a first output channel and a first input channel corresponding to the first output channel,
wherein the cable status detection module further comprises:
an output multiplexer, coupled to the generation circuit, and configured to output the first pulse signal to the first output channel in response to a selection signal; and
an input multiplexer, coupled to the reception circuit, and configured to receive the first feedback signal from the first input channel in response to the selection signal.

7. The network connection device as claimed in claim 2, wherein the generation circuit is further configured to generate a second pulse signal, wherein the second pulse signal is transmitted to the connection cable through the interface module, wherein a second amplitude value of the second pulse signal is smaller than a first amplitude value of the first pulse signal,
wherein the reception circuit is further configured to receive a second feedback signal fed back by the connection cable in response to the second pulse signal,
wherein the detection circuit is further configured to detect a second difference between the second pulse signal and the second feedback signal,
wherein the cable status detection module is further configured to update the detection result of the connection cable according to the second difference.

8. The network connection device as claimed in claim 2, wherein the detection circuit comprises:
a sampling circuit, configured to sample the first pulse signal and the first feedback signal; and
a comparison circuit, coupled to the sampling circuit, and configured to compare a pulse sampling value of the first pulse signal and a feedback sampling value of the first feedback signal.

9. The network connection device as claimed in claim 8, wherein the comparison circuit is further configured to compare a pulse sampling phase of the first pulse signal and a feedback sampling phase of the first feedback signal.

10. The network connection device as claimed in claim 8, wherein the comparison circuit further comprises a feedback detection circuit connected in series between the sampling circuit and the comparison circuit,
wherein the feedback detection circuit is configured to determine whether the feedback sampling value of the first feedback signal is greater than a predetermined value,
wherein the comparison circuit compares the pulse sampling value with the feedback sampling value when the feedback sampling value is greater than the predetermined value only.

11. The network connection device as claimed in claim 1, wherein the detection result of the connection cable is one of an open circuit status, a short circuit status, an un-match status and a match status.

12. The network connection device as claimed in claim 2, wherein the cable status detection module further comprises:
a state machine circuit, coupled to the generation circuit, the reception circuit and the detection circuit,
wherein the state machine circuit activates a counter in response to transmission of the first pulse signal, and determines whether the reception circuit receives the first feedback signal within a time range,
wherein the state machine circuit instructs the detection circuit to output the detection result of the connection cable if the reception circuit does not receive the first feedback signal within the time range.

13. A cable status detection method, adapted to a network connection device connected to a connection cable, wherein the network connection device is configured to send signal to the connection cable or receive signal from the connection cable, the cable status detection method comprising:
receiving a notification notifying that a physical layer transmission circuit in the network connection device is in a disable state; and
detecting a status of the connection cable by a cable status detection module configured in the network connection device when the physical layer transmission circuit is in the disable state, and generating a detection result of the connection cable,
wherein the step of detecting the status of the connection cable comprises:
receiving a first feedback signal fed back by the connection cable in response to a first pulse signal; and
executing direct current bias elimination and channel compensation on the first feedback signal.

14. The cable status detection method as claimed in claim 13, wherein the step of detecting the status of the connection cable and generating the detection result of the connection cable further comprises:
generating the first pulse signal and transmitting the first pulse signal to the connection cable;
detecting a first difference between the first pulse signal and the first feedback signal; and
generating the detection result of the connection cable according to the first difference.

15. The cable status detection method as claimed in claim 14, further comprising:
generating a second pulse signal and transmitting the second pulse signal to the connection cable, wherein a second amplitude value of the second pulse signal is smaller than a first amplitude value of the first pulse signal;
receiving a second feedback signal fed back by the connection cable in response to the second pulse signal;
detecting a second difference between the second pulse signal and the second feedback signal; and
updating the detection result of the connection cable according to the second difference.

16. The cable status detection method as claimed in claim 14, wherein the step of generating the first pulse signal and transmitting the first pulse signal to the connection cable comprises:
receiving the generated first pulse signal through a first path and transmitting the received first pulse signal to the connection cable,
wherein the step of receiving the first feedback signal fed back by the connection cable in response to the first pulse signal comprises:
receiving the first feedback signal from the connection cable and transmitting the received first feedback signal through a second path.

17. The cable status detection method as claimed in claim 16, further comprising:
routing the first pulse signal on the first path to the second path.

18. The cable status detection method as claimed in claim 14, wherein the connection cable comprises a plurality of channel sets, wherein a first channel set in the channel sets comprises a first output channel and a first input channel corresponding to the first output channel,
wherein the step of generating the first pulse signal and transmitting the first pulse signal to the connection cable comprises:
outputting the first pulse signal to the first output channel in response to a selection signal,
wherein the step of receiving the first feedback signal fed back by the connection cable in response to the first pulse signal comprises:
receiving the first feedback signal from the first input channel in response to the selection signal.

19. The cable status detection method as claimed in claim 14, further comprising:
activating a counter in response to transmission of the first pulse signal;
determining whether the first feedback signal is received within a time range; and
outputting directly the detection result of the connection cable if the first feedback signal is not received within the time range.

20. The cable status detection method as claimed in claim 14, wherein the step of detecting the first difference between the first pulse signal and the first feedback signal comprises:
sampling the first pulse signal and the first feedback signal; and
comparing a pulse sampling value of the first pulse signal and a feedback sampling value of the first feedback signal.

21. The cable status detection method as claimed in claim 20, wherein the step of comparing the pulse sampling value of the first pulse signal and the feedback sampling value of the first feedback signal comprises:
comparing a pulse sampling phase of the first pulse signal and a feedback sampling phase of the first feedback signal.

22. The cable status detection method as claimed in claim 20, wherein the step of detecting the first difference between the first pulse signal and the first feedback signal comprises:
determining whether the feedback sampling value of the first feedback signal is greater than a predetermined value,
wherein the step of comparing the pulse sampling value with the feedback sampling value is executed only when the feedback sampling value is greater than the predetermined value.

23. The cable status detection method as claimed in claim 13, wherein the detection result of the connection cable is one of an open circuit status, a short circuit status, an un-match status and a match status.

* * * * *